(12) United States Patent
Katrak et al.

(10) Patent No.: US 7,634,340 B2
(45) Date of Patent: Dec. 15, 2009

(54) SECURE CONTROL MODE TRANSITION METHODS FOR AN ACTIVE FRONT STEER SYSTEM

(75) Inventors: Kerfegar K. Katrak, Fenton, MI (US); Robert R. Bolio, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 331 days.

(21) Appl. No.: 11/679,202

(22) Filed: Feb. 27, 2007

(65) Prior Publication Data

US 2008/0208410 A1   Aug. 28, 2008

(51) Int. Cl.
 *G06F 7/00*   (2006.01)
(52) U.S. Cl. .......................... 701/42; 180/443
(58) Field of Classification Search .................... 701/42; 180/443
See application file for complete search history.

(56) References Cited

U.S. PATENT DOCUMENTS

| | | | |
|---|---|---|---|
| 5,670,856 A * | 9/1997 | Le et al. ..................... | 318/564 |
| 6,046,560 A * | 4/2000 | Lu et al. ..................... | 318/432 |
| 6,650,979 B1 * | 11/2003 | Kreft .......................... | 701/41 |
| 6,729,432 B1 * | 5/2004 | Yao et al. .................... | 180/402 |
| 6,820,715 B2 * | 11/2004 | Laurent et al. .............. | 180/443 |
| 7,222,008 B2 * | 5/2007 | Takahashi et al. ............ | 701/41 |

FOREIGN PATENT DOCUMENTS

| | | |
|---|---|---|
| DE | 102004009815 A1 | 9/2005 |
| DE | 102004009819 A1 | 9/2005 |
| DE | 102004009821 A1 | 9/2005 |
| DE | 60313678 | 1/2008 |
| DE | 60313678 T2 | 1/2008 |

\* cited by examiner

*Primary Examiner*—Mark Hellner

(57) ABSTRACT

A system and method for secure and restricted transitions between steering control modes for a vehicle with active front steering is disclosed. Possible operating control modes include precision, electric phase locking, and proportional integral derivative (PID) modes. Each operating control mode is monitored and the operational status of the modes are checked before transitioning. For security, the system can prevent transitions from PID to precision control mode and restrict electric phase locking mode to transition only to a mechanical locking mode.

20 Claims, 2 Drawing Sheets

SECURE CONTROL MODE TRANSITION METHODS FOR AN ACTIVE FRONT STEER SYSTEM

TECHNICAL FIELD

The present invention generally relates to active front steer control systems, and more particularly relates to the control of operating mode transitions for active front steering control systems.

BACKGROUND

Vehicle steering is generally controlled by a driver hand wheel that directs the angle of the vehicle road wheels used for steering. The movements of the driver hand wheel are transmitted to the vehicle road wheels by mechanical linkages and/or electronic components. The vehicle road wheels that change angle are generally located in the front of the vehicle in a system referred to as "front steering". The angle of the road wheels is referred to as road wheel angle.

Active front steering (AFS) is a term referring to the use of electronic components to actively control or assist the steering of a vehicle so as to enhance steering performance beyond that possible by only direct mechanical linkages. There are many possible ways to enhance steering performance; for example, steering can be adapted to the weather conditions, to the behavior and habits of the driver, provide orderly stopping if the driver loses control, enhance the driver hand wheel control by changing steering characteristics, or provide driver control in the event of a steering mechanism malfunction.

At higher speeds large changes in the angle of the vehicle wheels can cause relatively large shifts in direction. Driver control at high speeds requires subtle changes in angle of the driver hand wheel. At low and medium speeds, a vehicle generally will be used for larger turns for parking or turning a corner. Large turns of the driver hand wheel are usually necessary to make large turns of the vehicle wheels. Driving is easier if the vehicle wheels turn less for driver hand wheel turns at high speed and more for driver hand wheel turns at low speed.

Variable gear ratio (VGR) steering is a method in the AFS system for adding and subtracting steering angle at the front wheels to the angle implied by the driver's hand wheel input. This can be accomplished by mechanical or electrical components. It is desirable to insure that the VGR system is fail-safe, does not vary greatly from its intended operational parameters, and operates in a safe manner. Lead steer is a method of anticipating the driver's intent at the hand wheel. VGR and lead steer may be combined to calculate the road wheel angle.

In an AFS system, the intended angle at the hand wheel and the actual angle at the front steering wheels are monitored to assure certain security metrics are met. In automotive parlance, a security metric is a safety performance requirement. An electronic AFS system uses actuators to rotate the front road wheels for a given road wheel angle. The actuators can have a three, or single phase motors to control the front wheel steering angles.

In an electronic AFS system the actuator motor is often controlled by a Pulse Width Modulation (PWM) signal. The PWM control is utilized to generate analog signals using the modulation of the pulse width or duty cycle of a periodic digital signal to produce controlled analog voltages. For example, if a 12 volt battery is connected to a device and the duty cycle is about 50% alternated between about 12 volts and about zero volts, the effective output voltage is about 50% of that of a constant 12 volts or six volts. Similarly, a duty cycle of X % may give an output voltage of X % of the voltage range and, accordingly, power available may be less than the total power. The quality and smoothness of the analog voltage output can be effectuated with capacitor, inductor, and resistor based passive component circuits. Various algorithms or ("control modes") may use the PWM signal to control the behavior of a VGR system.

Precision control mode is used when the driver does not command significant changes in the target road wheel angle. When the commanded target road wheel angle is significantly small compared to the actual actuator angle, for example during high-speed highway driving, the AFS control system normally transitions to the precision control mode. Driver control at high speeds requires precision control of road wheel angle changes for subtle changes in angle of the driver hand wheel. The precision control uses only two phases of the actuator motor with a low PWM duty cycle to allow the driver to exit the precision control mode operation with large movements if the driver so desires.

Electric phase locking control mode is a method of electronically setting a fixed steering ratio in a VGR system. Electric phase locking also uses two phases of the actuator motor but at a high PWM duty cycle (for example, about 40%) to slow down the AFS actuator motor prior to mechanical locking of the AFS actuator when there are diagnosed errors in the system.

Proportional Integral Derivative (PID) control is a common method of control in industrial applications. The controller compares a measured output value from a process with a specified input value. The difference or "error" is used to calculate new process outputs to bring the process measured value back to the specified input value. A PID controller can adjust process inputs based on the history and the error signal rate of change yielding more stable and accurate control. A PID controller can also produce stable and accurate control when other algorithms would have a steady-state error or cause process oscillation. Cruise control in a car, a house thermostat, and electronic throttle control of vehicles and aircraft are common examples of how PID controllers are used to automatically adjust process inputs to hold a measured value to a specified reference value. In normal operation, the PID control keeps the AFS system's VGR actuator motor synchronized to a specified angle.

At present, an AFS system module with a low level control algorithm performs PID control, precision control, and electric phase locking control without differentiating between these cases. PID control is performed by controlling three phases of the AFS actuator motor. As mentioned above, precision control is performed by controlling only two phases of the AFS actuator motor with a low PWM duty cycle and the electric phase locking control is performed also by using two phases of the AFS actuator motor but at a high PWM duty cycle. The cases that need to be differentiated are transition from PID control or precision control to electric phase locking control, and transition from precision control to PID control. It is desirable to design a new system and method to allow an AFS system to securely transition from one control mode to another and to prevent unintentional transitions that may be undesirable, useless, or non-functional.

BRIEF SUMMARY

A new system and method for secure and restricted transitions between steering control modes for a vehicle with active front steering is provided. Possible operating control modes include precision, electric phase locking, and proportional integral derivative (PID). The operational status of the modes are checked before transitioning.

An example embodiment of this invention is utilized for controlling operating mode transitions in an active front steer (AFS) control system having a PID control mode, a precision control mode, and an electric phase locking control mode. This method maintains a current transition control indicator value that corresponds to a current operating mode of the AFS control system and monitors the AFS control system for occurrence of the current transition control indicator value and initiates the electric phase locking control mode upon detection of an unexpected transition control indicator value. The transition control indicator values are based on a memory fault model such that each transition control indicator value is immune to a single bit, a single nibble, a single byte, a stuck-at-zero (SA0) or a stuck-at-one (SA1) error. The method further obtains a plurality of logical indicators corresponding to a current operating mode and changes the current transition control indicator value to a new transition control indicator value if the logical indicators do not correspond to the current operating mode. The system will then make a secure transition from the current operating mode to a new operating mode, corresponding to the new transition control indicator value.

For security, the techniques described herein can prevent transitions from PID to precision control mode and restrict electric phase locking control mode to transition only to a mechanical locking control mode. The transition is secure because the method monitors the operating modes to prevent transition from electric phase locking mode to the precision control mode and to the PID control mode.

Other desirable features and characteristics of embodiments of the present invention will become apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of steering control systems and that the vehicle system described herein is merely one example embodiment of the invention.

For the sake of brevity, conventional techniques related to signal processing, data transmission, signaling, actuator control, variable gear ratio systems, active steering, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Figure 1:
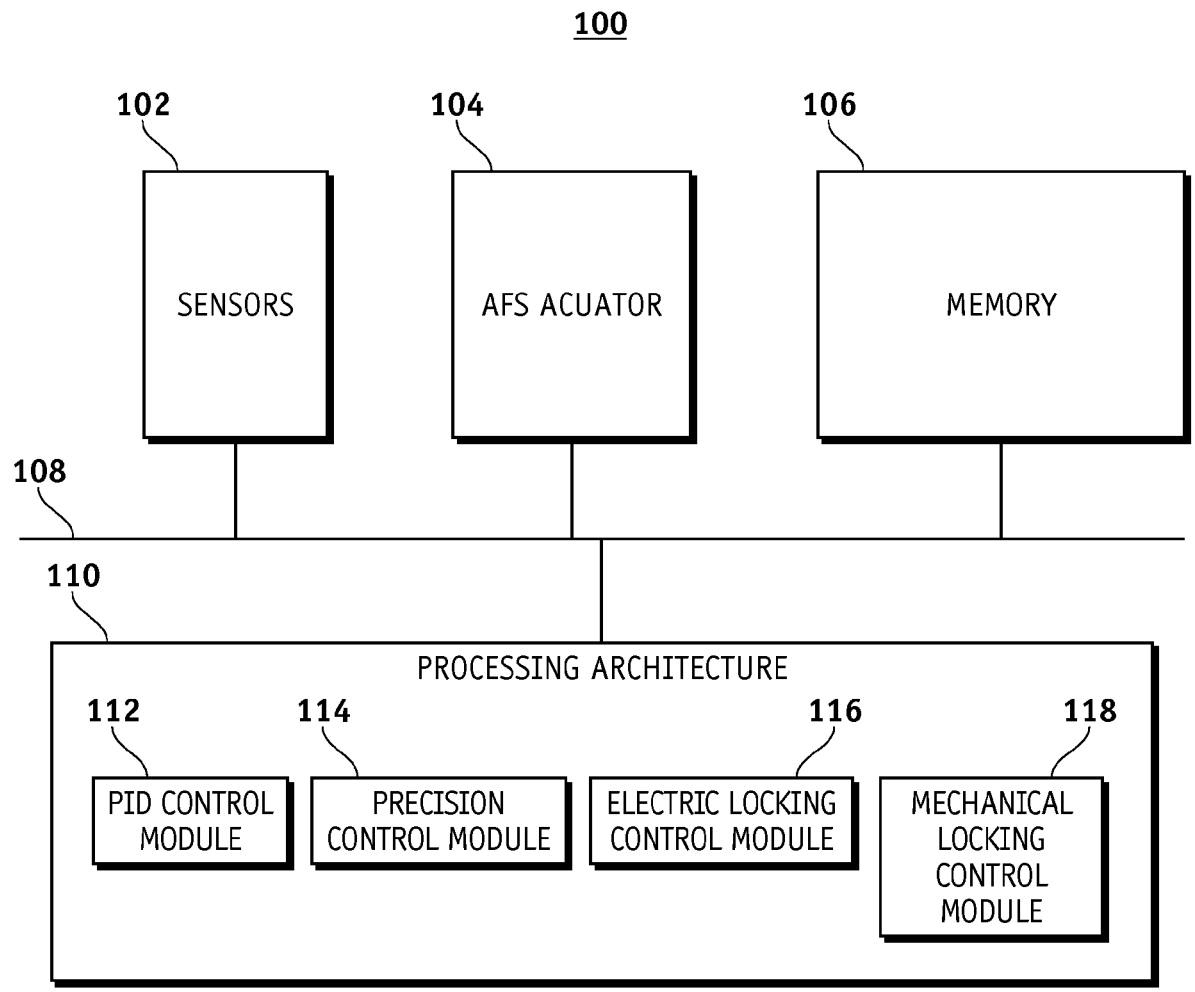
FIG. 1 is a schematic representation of an AFS system configured in accordance with an example embodiment of the invention.

"Connected/Coupled"—The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one example arrangement of elements, additional intervening elements, devices, features, or components may be present in an embodiment of the invention (assuming that the functionality of the circuit is not adversely affected).

A system and method according to an example embodiment of the invention accommodates secure and restricted transitions between steering control modes for a vehicle with active front steering (AFS). Possible operating control modes include precision, electric phase locking, and proportional integral derivative (PID). The operational status of the modes are checked before transitioning. For security, the system can prevent transitions from PID to precision control mode and restrict electric phase locking control mode to transition only to a mechanical locking control mode.

Electronic AFS systems use chains of electronic parts and software to form a control path. FIG. 1 is a schematic representation of an AFS system 100 that is suitably configured to perform control mode transition processes according to embodiments of this invention. The various block modules depicted in FIG. 1 may be realized in any number of physical components or modules located throughout the vehicle or the AFS system 100. A practical AFS system 100 may include a number of electrical control units (ECUs), computer systems, and components other than those shown in FIG. 1. Conventional subsystems, features, and aspects of AFS system 100 will not be described in detail herein.

AFS system 100 generally includes a plurality of sensors 102, an AFS actuator 104, a memory 106, an interconnect bus or other coupling arrangement 108, and a processing logic element 110. The processing logic element 110 may include, without limitation: a PID control module 112, a precision control module 114, an electric phase locking control module 116 and a mechanical locking control module 118. In practice, these elements may be coupled together using the interconnect bus 108, which may be a CAN bus in a typical vehicle application.

In the example embodiment, the sensors 102 are devices for measuring the AFS actuator angle, and the sensor output is utilized as feedback by the AFS system 100 control modes in processing logic element 110. In practice, the sensors may be, without limitation, logical devices located between a wave motion generator, a flexible gear and a stator gear inside an AFS motor in the vehicle or other locations not shown in FIG. 1.

The AFS actuator 104 controls the actuator angle for the AFS system 100. The AFS actuator angle sets the target steering angle position of the vehicle wheels. The AFS actuator 104 may be located at a flexible gear inside the AFS motor or other locations not shown in FIG. 1.

The memory 106 may be any suitable data storage that is formatted to support the operation of the AFS system 100. Memory 106 is configured to store, maintain, and provide data as needed to support the functionality of the AFS system 100 in the manner described below. In practical embodiments, memory 106 may be realized as RAM memory, flash memory, hard disk, EEPROM or any other form of rewritable storage medium known in the art. The memory 106 may be coupled to the processing logic element 110 to store the AFS parameters. These AFS parameters may include, for example, logical indicators values used to designate which control mode is used by the processing logic element 110 and the transition control indicator values. Other AFS parameters may be stored in the memory including, without limitation, the target actuator angle, the actual actuator angle, a commanded PWM duty cycle value, and a measured or inferred PWM duty cycle value.

The interconnect bus 108 in an AFS system 100 module can use a Controller Area Network (CAN) bus to communicate with other components or systems in the vehicle. A CAN bus is a popular data communication bus for in-vehicle communications applications and high and low-speed fault-tolerant applications. CAN has oriented data transmission and multi-master capability, and has been standardized as International Standards Organization ISO-11898. At present, high-speed CAN reaches 1 Mbps and is used for engine and power train control, and low-speed CAN reaches 125 Kbps and is used for body and consumer device control. The interconnect bus 108 can also use a FlexRay network bus to communicate with other components or systems in the vehicle. A FlexRay network bus is a high speed data communication bus for in-vehicle communications applications. FlexRay network has time triggered behavior, redundancy, safety, and fault-tolerance capability, and has been specified by FlexRay Consortium. At present, high-speed FlexRay network reaches 10 Mbps.

Processing logic element 110 may include any number of distinct processing modules or components that are configured to perform the tasks, processes, and operations described in more detail herein. Although only one processing block is shown in FIG. 1, a practical implementation may utilize any number of distinct physical and/or logical processors, which may be dispersed throughout AFS system 100. In practice, the processing logic element 110 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

In the example embodiment, the processing logic element 110 is configured to perform the AFS system 100 control mode transition processes described herein. Processing logic element 110 is configured to obtain a plurality of logical indicators as explained below and determine a transition condition between a current and a new control mode. Processing logic element 110 monitors the PID control module 112 and the precision control module 114 for occurrence of a particular transition control indicator value. If this transition control indicator value is not detected, the processing logic element 110 locks the AFS actuator 104 electronically utilizing the electric locking control module 116, followed by a mechanical locking utilizing the mechanical locking control module 118.

Normally the vehicle operates in PID control mode utilizing PID control module 112. This is because the PID control mode is the most robust algorithm for feedback control.

If the vehicle has been operating at high speed for some time, precision control module 114 may be selected by the processing logic element 110 to give the AFS system 100 more precise hand wheel performance to improve the driver experience. When operating in the precision control mode, the AFS system 100 may utilize the precision control mode module 114. When the vehicle decelerates, the AFS system 100 (through processing logic element 110) will generally transition back to PID control.

If a fault is detected, the processing logic element 110 may transition to electric phase locking control mode. When operating in the electric phase locking control mode, the AFS system 100 utilizes the electrical phase locking module 116. The electric phase locking control mode phase locks the AFS actuator motor to a fixed ratio, and the processing logic element 110 will generally transition to mechanical locking control mode using mechanical locking control module 118.

An AFS system control mode transition process is described below. For a secure transition from one control mode to another, the AFS system 100 utilizes a plurality of logical indicators to indicate various transition conditions. If the plurality of the logical indicators correspond to a new control mode, the AFS system 100 changes its current transition control indicator value corresponding to the current control mode to a different transition control indicator value corresponding to the new control mode. Otherwise the AFS system 100 continues monitoring the current control mode for occurrence of the current transition control indicator value. If the current transition control indicator value is not detected, the AFS system 100 will initiate an electric phase locking control mode followed by a mechanical locking control mode. For further security, the AFS system 100 may be configured to prevent certain types of transitions. For example, the AFS system 100 may be configured to prevent transitions from the electric phase locking control mode to any other control mode and from the PID control mode to the precision control mode.

Figure 2:
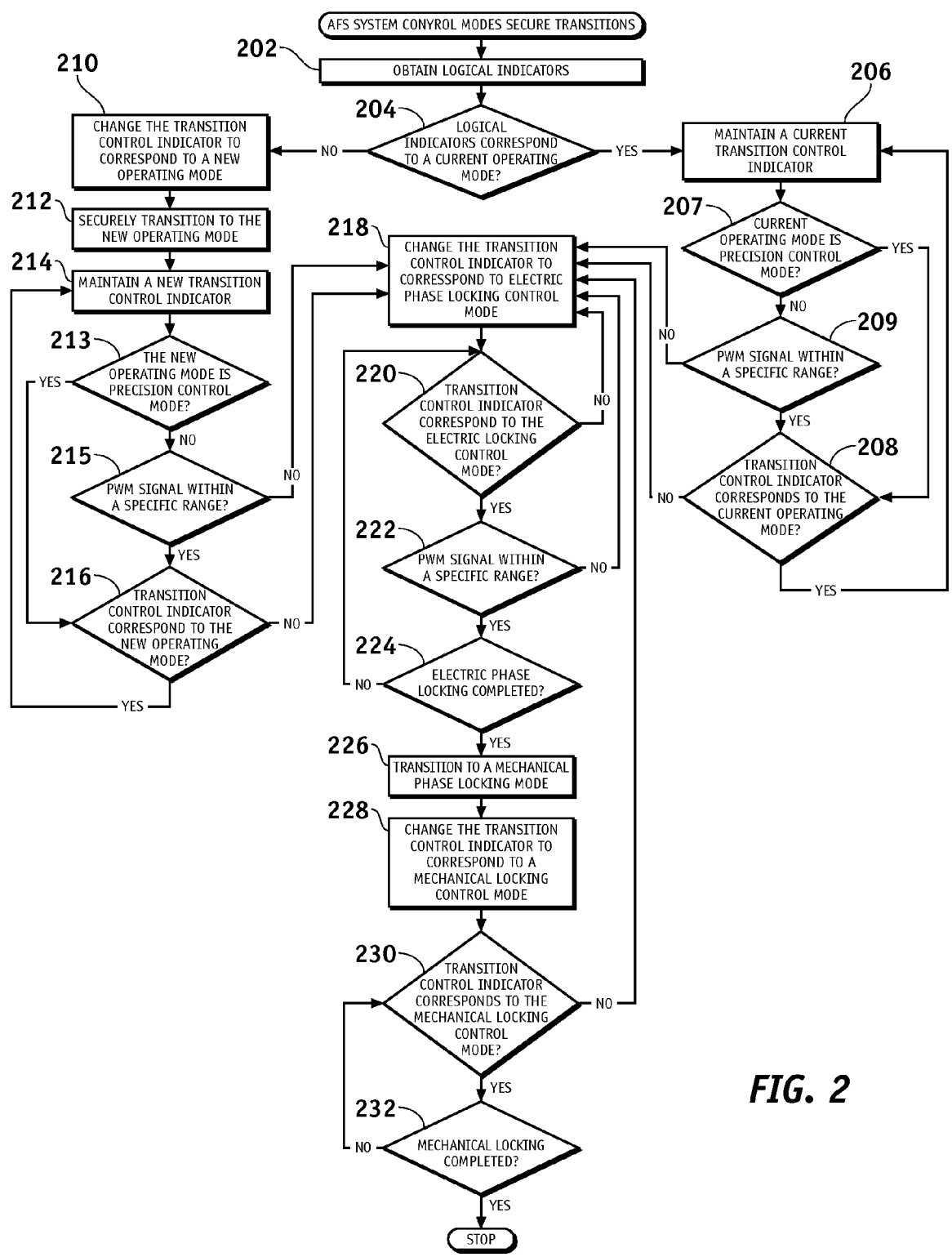
FIG. 2 is a flow chart of an AFS system control modes secure transitions process according to an example embodiment of the invention.

FIG. 2 is a flow chart of an AFS system control modes secure transitions process according to an example embodiment of the invention. The various tasks performed in connection with process 200 may be performed by software, hardware, firmware, or any combination thereof For illustrative purposes, the following description of process 200 may refer to elements mentioned above in connection with FIG. 1. In practical embodiments, portions of process 200 may be performed by different elements of the AFS system 100, e.g. the sensors 102, the AFS actuator 104, the memory 106, or the processing logic element 110.

The AFS system 100 control modes secure transitions process 200 may begin by obtaining a plurality of logical indicators corresponding to a current operating mode (task 202). Transition conditions from one control mode to another are determined by obtaining and processing the logical indicators as follows. In this example embodiment of the invention, the transition condition from the PID control mode to the precision control mode is based on two logical (True, False) indicators, which may be independently obtained from two different control paths of processing logic element 100 (primary and redundant control paths) as described in co-pending U.S. Ser. No. 11/530,600 filed Sep. 11, 2006; the relevant content of this co-pending patent application is incorporated by reference herein. The logical indicators can be dynamically obtained during AFS system 100 operation, as follows. A first logical indicator is based on an error corresponding to the difference between the target actuator angle and the actual actuator angle obtained from the primary control path. A second logical indicator is based on an error corresponding to the difference between the target actuator angle and the actual actuator angle obtained from the redundant control path. If each error value is higher than expected, the logical indicator indicates "False" otherwise the logical indicator indicates "True". If either or both logical indicators is/are false then AFS system 100 remains in the PID control mode. If both of the logical indicators are True, the error value is within an expected range and the AFS system 100 transitions to the precision control mode. The error value may be a function of the vehicle speed, the actuator motor speed, and/or time. Although only two logical indicators are used in this example embodiment of the invention, any number of a plurality of logical indicators obtained from a plurality of dual paths may be used for other embodiments of this invention.

The transition condition from the precision control mode to the PID control mode is based on four logical indicators each obtained independently from two separate dual control paths of the processing logic element 110 (a first primary control path, a first redundant control path, a second primary control path, and a second redundant control path) as described in the co-pending U.S. patent application referenced above. These logical indicators can be dynamically obtained during AFS system 100 operation, as follows. A first logical indicator is obtained from the first primary control path, and the second logical indicator is obtained from the first redundant control path based on the error between the target actuator angle and the actual actuator angle as explained above. A third logical indicator is obtained from the second primary control path based on an error between a present value of the target actuator angle and a past value of the same target actuator angle. A fourth logical indicator is obtained from the second redundant control path based on an error between a present value of the target actuator angle and a past value of the same target actuator angle. If all of the four logical indicators indicate False (the error value is within an expected range), then the AFS system 100 remains in the precision control mode. If any one of the four logical indicators indicates True (the error value is larger than the expected range), then the AFS system 100 transitions to the PID control mode. The expected range of error value between the actual actuator angle and the target actuator angle may be a function of the vehicle speed, the actuator motor speed and time as mentioned above. The expected range of the error value between the past and present values of the target actuator angles may be, without limitation, a few degrees (about 0.0 to 10 degrees). Although only four logical indicators are used for this example embodiment of the invention, any number of a plurality of logical indicators obtained from a plurality of dual paths may be used for other embodiments of this invention.

The current operating mode, for example, may be a PID control mode for normal driving or a precision control mode for high speed driving. To assure safety, process 200 may prevent transitions from the PID control mode to the precision control mode, from the electric phase locking control mode to the PID control mode, and from the electric phase locking control mode to the precision control mode. Thus, process 200 may be performed to make a transition decision by determining whether the logical indicators correspond to a current operating mode (inquiry task 204). If the logical indicators correspond to the current operating mode, then process 200 may continue operating in the current operating mode by maintaining a current transition control indicator value that corresponds to a current operating mode of the AFS system 100 (task 206). Additionally, as explained below, AFS system 100 monitors each control mode except for the precision control mode for occurrence of a PWM signal within a specific range. The PWM signal should remain within a specific range for each control mode to assure a secure transition from one control mode to another.

When transitioning from the PID control mode to the electric phase locking control mode, the PWM signal duty cycle of, for example, up to 50% (depending on the steering rack ratio, speed of the actuator motor and time it takes to stop the actuator motor) of the total PWM signal duty cycle may be commanded to stop the actuator from moving. The specific range of an actual PWM signal duty cycle may be up to ±3% different from the commanded PWM signal duty cycle.

The specific range for the PWM signal for the electric phase locking is normally centered at a specific value. For example, the specific range for the PWM signal during the phase locking may be 34.5%-35.5% which is centered at about 35% with about ±0.5% tolerance.

When transitioning from the precision control mode to the electric phase locking control mode (the actuator motor holds its current position during the transition), the PWM signal with a duty cycle of, for example, about 5% to 15% (depending on the steering rack ratio and speed of the actuator motor) of the total PWM signal duty cycle may be commanded to hold the actuator motor at its current position. The specific range of an actual PWM signal may be about ±0.1% different from the commanded PWM signal duty cycle. For example, if the PWM duty cycle is about 15%, the specific range may be about 14.9-15.1%.

Since the precision control mode requires a tighter control than the PID control mode, the specific range of the actual PWM signal duty cycle in this case is expected to vary less than the specific range of the actual PWM signal duty cycle for the transition from the PID to electric phase locking as explained above.

Thus, process 200 checks to determine whether the current operating mode is the precision control mode (inquiry task 207) and if the current operating mode is not the precision control mode, process 200 proceeds to determine whether the PWM signal is within the specific range (inquiry task 209). If the PWM signal is not within the specific range, process 200 proceeds to initiate the phase locking control mode (task 218). Otherwise process 200 proceeds to monitor the AFS system 100 for occurrence of the current transition control indicator value (inquiry task 208). However, if the current operating mode is the precision control mode, process 200 skips inquiry task 207 and proceeds to inquiry task 208. While monitoring the AFS control system in the current operating mode, if process 200 determines that the transition control indicator value does not correspond to the current operating mode (inquiry task 208), then process 200 may proceed to initiate the electric phase locking control mode (task 218), as explained below, upon detection of an unexpected transition control indicator value. However, if process 200 determines that the transition control indicator value corresponds to the current operating mode, then process 200 may lead back to task 206 to continue operation in the current operating mode.

The transition control indicator, for example, based upon the memory fault model mentioned above, may be, without limitation, equal to 54 decimal for the PID control mode and 89 decimal for the precision control mode. The current transition control indicator value may change unexpectedly due to an error in the memory fault model such as 54 to 55 or due to a microprocessor error such as a processor sequence error when, for example, a stack pointer is lost. An unexpected change in the current transition indicator value may represent an AFS system failure upon which process 200 may proceed to initiate the electric phase locking mode as explained below.

Process 200 may securely transition to a new operating mode (i.e. PID control mode or PC control mode) as follows. A change in transition control indicator value is indicative of a transition to a new operating mode. Thus, following the inquiry task 204, process 200 may proceed to change the transition control indicator value to a new transition control indicator value (task 210), if the logical indicator does not correspond to the current operating mode, and then a secure transition is made from the current operating mode to a new operating mode corresponding to the new transition control indicator value (task 212). For clarity, it should be noted that task 204 determines which of the AFS system 100 new operating modes to securely transition to (i.e., from PID control mode to PC control mode or from PC control mode to PID control mode) and task 208 monitors the current operating mode (i.e., PC control mode or PID control mode) before the transition to the new operating mode has taken place. To continue operation in the new operating mode, process 200 may then proceed to maintain the new transition control indicator value that corresponds to the new operating mode (task 214).

As mentioned above, with the exception of the precision control mode, the AFS system 100 monitors each control mode for occurrence of a specific range of the PWM signal. Thus, process 200 checks to determine whether the new operating mode is the precision control mode (inquiry task 213), and if the new operating mode is not the precision control mode, process 200 proceeds to determine whether the PWM signal is within the specific range (inquiry task 215). If the PWM signal is not within the specific range, process 200 proceeds to initiate the phase locking control mode (task 218). Otherwise process 200 proceeds to monitor the AFS system 100 for occurrence of the new transition control indicator value (inquiry task 216). However, if the current operating mode is the precision control mode (inquiry task 213), process 200 skips the inquiry task 215 and proceeds to inquiry task 216. While monitoring the AFS control system in the new operating mode, if process 200 determines that the transition control indicator value does not correspond to the new operating mode (inquiry task 216), then process 200 may proceed to initiate the electric phase locking control mode (task 218), as explained below, upon detection of an unexpected transition control indicator value. However, if process 200 determines that the transition control indicator value corresponds to the new operating mode, then process 200 may lead back to task 214 to continue operation in the new operating mode.

In an automotive application, it is preferable to electronically lock the AFS actuator 104 before mechanically locking the AFS actuator 104. This is specifically done because the processing logic element 110 phase-locks the actuator motor fast enough so that when the system eventually mechanically locks the actuator motor it does not move the lock holder back and forth to protect the actuator parts from potential damage that may otherwise be caused by a direct mechanical locking. Normally, lock holders have a reference position for locking the actuator motor, moving the lock holder back and forth may result in losing the lock holder reference position which may result in locking the actuator at a position other than what was commanded. Thus, as mentioned above, following the inquiry tasks 208 or 216, process 200 may initiate a transition to the electric phase locking control mode before proceeding to the mechanical locking control mode. To initiate a secure transition to the electric phase locking mode, process 200 may change the transition control indicator value to correspond to the electric phase locking control mode upon detection of the unexpected transition control indicator value (task 218). The unexpected transition control value is any transition control value other than the decimal value, as mentioned above, assigned to each control mode and stored in memory 106.

To insure that the transition control indicator value has been properly changed and maintained thereafter for operating in the electric phase locking control mode, process 200 may then immediately proceed to monitor the AFS control system 100 for occurrence of the transition control indicator value corresponding to the electric phase locking control mode (inquiry task 220). For example, the transition control indicator value, may be, without limitation, equal to 106 decimal for the electric phase locking control mode. If the transition control indicator value corresponding to the electric phase locking control mode is not detected (for example, if an error occurs due to the memory fault model and/or a microprocessor error as explained above), process 200 may lead back to task 218. However, if process 200 determines that the transition control indicator value corresponding to the electric phase locking control mode is detected, process 200 may proceed to, additionally, monitor a pulse width modulation (PWM) signal for occurrence of a specific range during the electric phase locking control mode (inquiry task 222).

As mentioned above, the PWM signal controls the AFS actuator motor at a certain percentage of the total PWM duty cycle. The PWM signal duty cycle is often reduced from the total PWM duty cycle to control the actuator motor with an available power that is less than the total power as explained above. In this example embodiment of the invention, the available power varies for each control mode. Furthermore, the PWM signal should remain within a specific range for each control mode to assure a secure transition from one control mode to another. In this example embodiment, the AFS system 100 is monitored for occurrence of the specific range of the PWM signal duty cycle, as explained above, when transitioning from the PID control mode or the precision control mode to the electric phase locking control mode, and when transitioning from the PID control mode to the precision control mode. The specific range of the PWM signal need not be monitored when transitioning from the precision control mode to the PID control mode since the specific range of the PWM signal varies randomly in this case.

If the PWM signal is not within the specific range, process 200 may lead back to task 218, otherwise process 200 may proceed to complete the electric phase locking. Process 200 may then determine whether an electric phase locking is completed (inquiry task 224). The AFS system considers the electric phase locking to be completed when the AFS actuators stop moving more than 1%-2% of overall rotation (i.e., about 360 degrees) of the actuator motor from one control loop to another (each control loop, for example, is about two milliseconds) or when sufficient time has passed from initiating the electric phase locking. If the electric phase is not completed, process 200 may lead back to task 220 until the phase locking is completed, otherwise process 200 may initiate transition from the electric phase locking control mode to the mechanical locking control mode (in the mechanical locking control mode no PWM control/electric phase locking control is used) if the electric phase locking is completed (task 226).

To initiate a secure transition from the electric phase locking control mode to the mechanical locking control mode, process 200 may change the transition control indicator value to correspond to the mechanical phase locking control mode (task 228). To insure that the transition control indicator has been properly changed and maintained thereafter for operating in the mechanical locking control mode, process 200 may then proceed to monitor the AFS system 100 for occurrence of the transition control indicator value corresponding to the mechanical locking control mode (inquiry task 230). For example, the transition control indicator value corresponding to the mechanical locking control mode, may be, without limitation, equal to 156 decimal. If the transition control indicator value corresponding to the mechanical locking control mode is not detected (for example, if an error occurs), process 200 may lead back to task 218. However, if process 200 determines that the transition control indicator value corresponding to the mechanical locking control mode is detected, process 200 may proceed to complete mechanical locking (task 232) of the AFS actuator motor. Process 200 may continue leading back to task 230 to continue monitoring the mechanical locking control mode until the mechanical locking (task 232) is completed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling operating mode transitions in an active front steer (AFS) control system capable of operating in a proportional, integral, and derivative (PID) control mode, a precision control mode, and an electric phase locking control mode, the method comprising:
   maintaining a current transition control indicator value that corresponds to a current operating mode of the AFS control system;
   monitoring the AFS control system for occurrence of the current transition control indicator value; and
   initiating the electric phase locking control mode upon detection of an unexpected transition control indicator value.

2. A method according to claim 1, further comprising monitoring a pulse width modulation signal for occurrence of a specific range during the electric phase locking control mode.

3. A method according to claim 1, further comprising monitoring a pulse width modulation signal for occurrence of a specific range during the PID control mode.

4. A method according to claim 1, further comprising initiating a mechanical locking control mode if an electric phase locking is completed.

5. A method according to claim 1, further comprising preventing transitions from the electric phase locking control mode to the PID control mode.

6. A method according to claim 1, further comprising preventing transitions from the electric phase locking control mode to the precision control mode.

7. A method according to claim 1, further comprising preventing transitions from the PID control mode to the precision control mode.

8. A method according to claim 1, further comprising changing the current transition control indicator value to correspond to the electric phase locking control mode upon detection of the unexpected transition control indicator value.

9. A method for controlling operating mode transitions in an active front steer (AFS) control system capable of operating in a proportional, integral, and derivative (PID) control mode, a precision control mode, and an electric phase locking control mode, the method comprising:
   obtaining a plurality of logical indicators corresponding to a current operating mode;
   changing a current transition control indicator value to a new transition control indicator value if the logical indicators do not correspond to the current operating mode; and
   securely transitioning from the current operating mode to a new operating mode corresponding to the new transition control indicator value.

10. A method according to claim 9, further comprising transitioning from the PID control mode to the precision control mode if all of the logical indicators indicate True.

11. A method according to claim 9, further comprising remaining in the PID control mode if any one of the logical indicators indicates False.

12. A method according to claim 9, further comprising transitioning from the precision control mode to the PID control mode if any one of the logical indicators indicates True.

13. A method according to claim 9, further comprising remaining in the precision control mode if all of the logical indicators indicate False.

14. A method according to claim 9, further comprising transitioning from the electric phase locking control mode to a mechanical locking control mode if an electric phase locking is completed.

15. A method for controlling operating mode transitions in an active front steer (AFS) control system capable of operating in a proportional, integral, and derivative (PID) control mode, a precision control mode, and an electric phase locking control mode, the method comprising:
   obtaining logical indicators for an AFS control system operating mode;
   securely transitioning from the precision control mode to the PID control mode if the logical indicators correspond to the PID control mode;
   securely transitioning from the PID control mode to the precision control mode if the logical indicators correspond to the precision control mode;
   maintaining an expected transition control indicator value that corresponds to a current operating mode of the AFS control system;

securely transitioning from the PID control mode to the electric phase locking control mode if an expected transition control indicator value corresponding to the PID control mode is not detected; and securely transitioning from the precision control mode to the electric phase locking control mode if an expected transition control indicator value corresponding to the precision control mode is not detected.

16. A method according to claim 15, further comprising monitoring a pulse width modulation signal for occurrence of a specific range during the electric phase locking control mode.

17. A method according to claim 15, further comprising monitoring a pulse width modulation signal for occurrence of a specific range during the PID control mode.

18. A method according to claim 15, further comprising preventing transitions from the PID control mode to the precision control mode.

19. A method according to claim 15, further comprising preventing transitions from the electric phase locking control mode to the PID control mode.

20. A method according to claim 15, further comprising preventing transitions from the electric phase locking control mode to the precision control mode.

* * * * *